(12) United States Patent
Heo et al.

(10) Patent No.: US 10,658,677 B2
(45) Date of Patent: May 19, 2020

(54) SOLID OXIDE FUEL CELL MANUFACTURING METHOD, SOLID OXIDE FUEL CELL AND CELL MODULE COMPRISING SAME

(71) Applicant: LG CHEM, LTD., Seoul (KR)

(72) Inventors: Yeonhyuk Heo, Daejeon (KR); Kwangwook Choi, Daejeon (KR); Dong Oh Shin, Daejeon (KR); Sanghyeok Im, Daejeon (KR); Jong Woo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 209 days.

(21) Appl. No.: 15/578,999

(22) PCT Filed: Aug. 25, 2016

(86) PCT No.: PCT/KR2016/009415
§ 371 (c)(1),
(2) Date: Dec. 1, 2017

(87) PCT Pub. No.: WO2017/034334
PCT Pub. Date: Mar. 2, 2017

(65) Prior Publication Data
US 2018/0145337 A1 May 24, 2018

(30) Foreign Application Priority Data
Aug. 26, 2015 (KR) .................. 10-2015-0120160

(51) Int. Cl.
*H01M 4/90* (2006.01)
*H01M 8/1246* (2016.01)
(Continued)

(52) U.S. Cl.
CPC ....... *H01M 4/9025* (2013.01); *H01M 4/8642* (2013.01); *H01M 4/8828* (2013.01);
(Continued)

(58) Field of Classification Search
None
See application file for complete search history.

(56) References Cited

U.S. PATENT DOCUMENTS 6,228,521 B1 * 5/2001 Kim .................... H01M 4/8657
429/496
2005/0112453 A1 5/2005 Song et al.
(Continued)

FOREIGN PATENT DOCUMENTS

CN 101000965 A 7/2007
CN 101752586 A 6/2010
(Continued)

OTHER PUBLICATIONS

International Search Report, issued in PCT/KR2016/009415 (PCT/ISA/210), dated Nov. 29, 2016.
(Continued)

*Primary Examiner* — Alix E Eggerding
(74) *Attorney, Agent, or Firm* — Birch, Stewart, Kolasch & Birch, LLP

(57) ABSTRACT

The present specification relates to a method for manufacturing a solid oxide fuel cell, a solid oxide fuel cell and a cell module including the same.

8 Claims, 3 Drawing Sheets

(51) Int. Cl.
*H01M 4/88* (2006.01)
*H01M 8/1213* (2016.01)
*H01M 4/86* (2006.01)
*H01M 8/1226* (2016.01)
*H01M 8/249* (2016.01)
*H01M 8/124* (2016.01)

(52) U.S. Cl.
CPC ....... *H01M 4/8885* (2013.01); *H01M 8/1213* (2013.01); *H01M 8/1226* (2013.01); *H01M 8/1246* (2013.01); *H01M 8/249* (2013.01); *H01M 2008/1293* (2013.01); *Y02E 60/525* (2013.01); *Y02P 70/56* (2015.11)

(56) References Cited

U.S. PATENT DOCUMENTS

| | | |
|---|---|---|
| 2010/0136380 A1 | 6/2010 | Hendriksen et al. |
| 2014/0087288 A1 | 3/2014 | Momiyama et al. |
| 2016/0197355 A1 | 7/2016 | Heo et al. |
| 2018/0205105 A1* | 7/2018 | Takeuchi ............ H01M 4/8668 |

FOREIGN PATENT DOCUMENTS

| | | | |
|---|---|---|---|
| CN | 102593478 A | | 7/2012 |
| EP | 1 598 892 | * | 5/2005 |
| EP | 1 598 892 A1 | | 11/2005 |
| EP | 2 405 514 A1 | | 1/2012 |
| JP | 9-245810 A | | 9/1997 |
| JP | 2005-158436 A | | 6/2005 |
| JP | 2010-238431 A | | 10/2010 |
| JP | 2011-34819 A | | 2/2011 |
| JP | 2012-230888 A | | 11/2012 |
| JP | 2013-229311 A | | 11/2013 |
| KR | 10-2003-0045324 A | | 6/2003 |
| KR | 10-2011-0135262 A | | 12/2011 |
| KR | 10-2015-0035457 A | | 4/2015 |

OTHER PUBLICATIONS

European Search Report for Appl. No. 16839622.4 dated Apr. 17, 2019.

* cited by examiner

【FIG. 1】
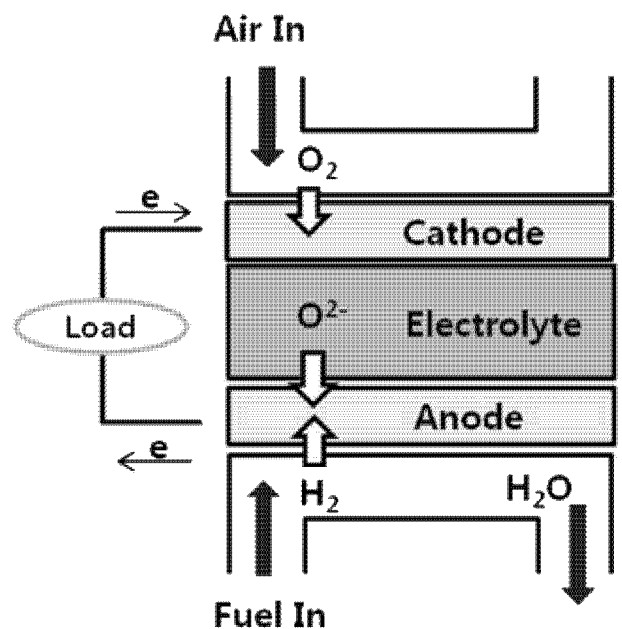
【FIG. 2】
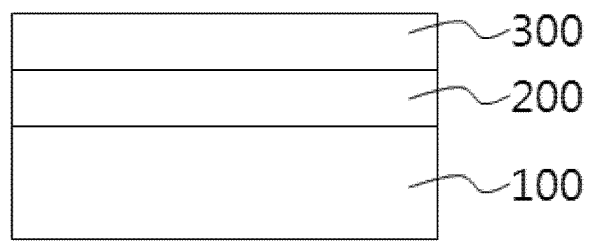

【FIG. 3】
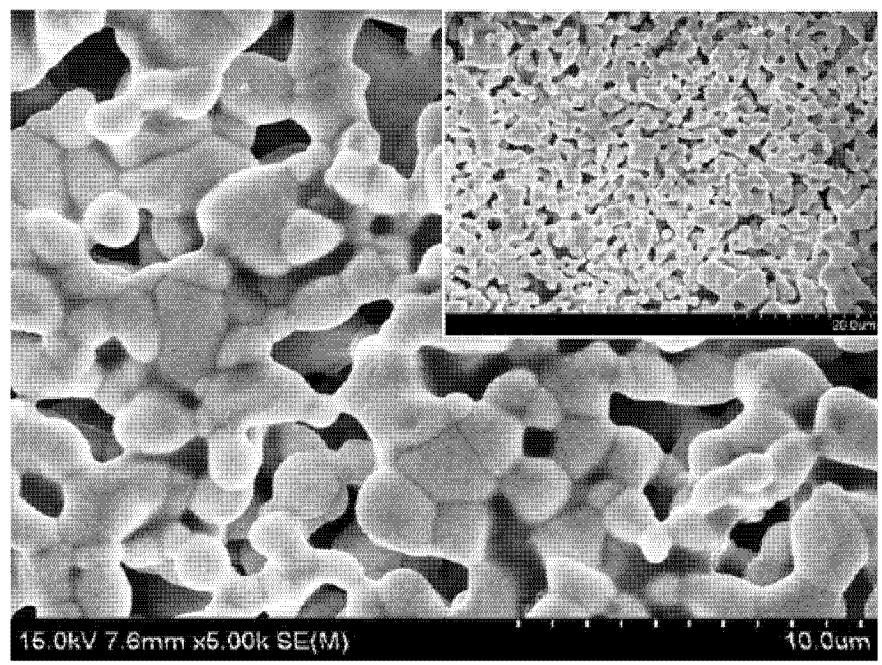
【FIG. 4】
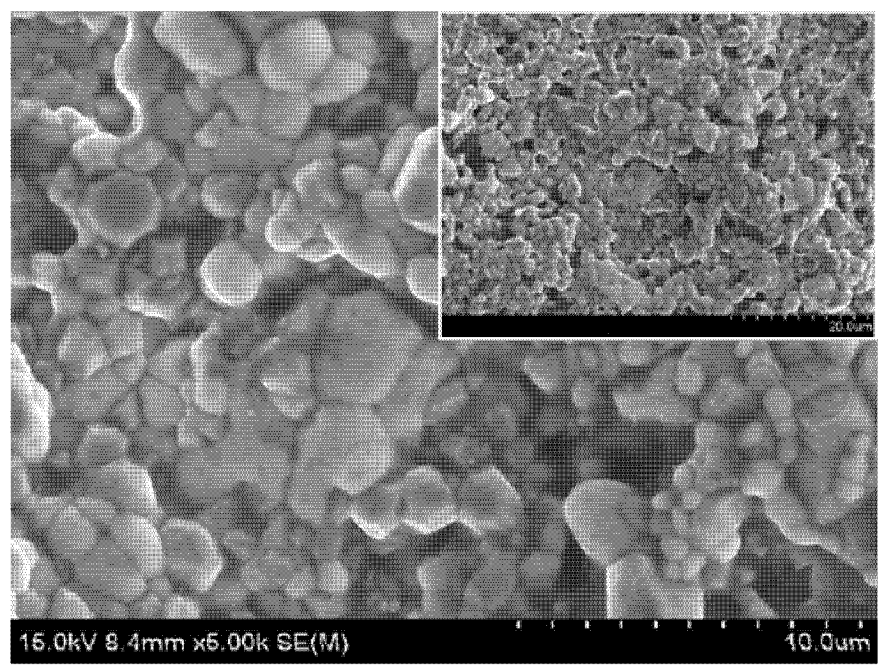

【FIG. 5】
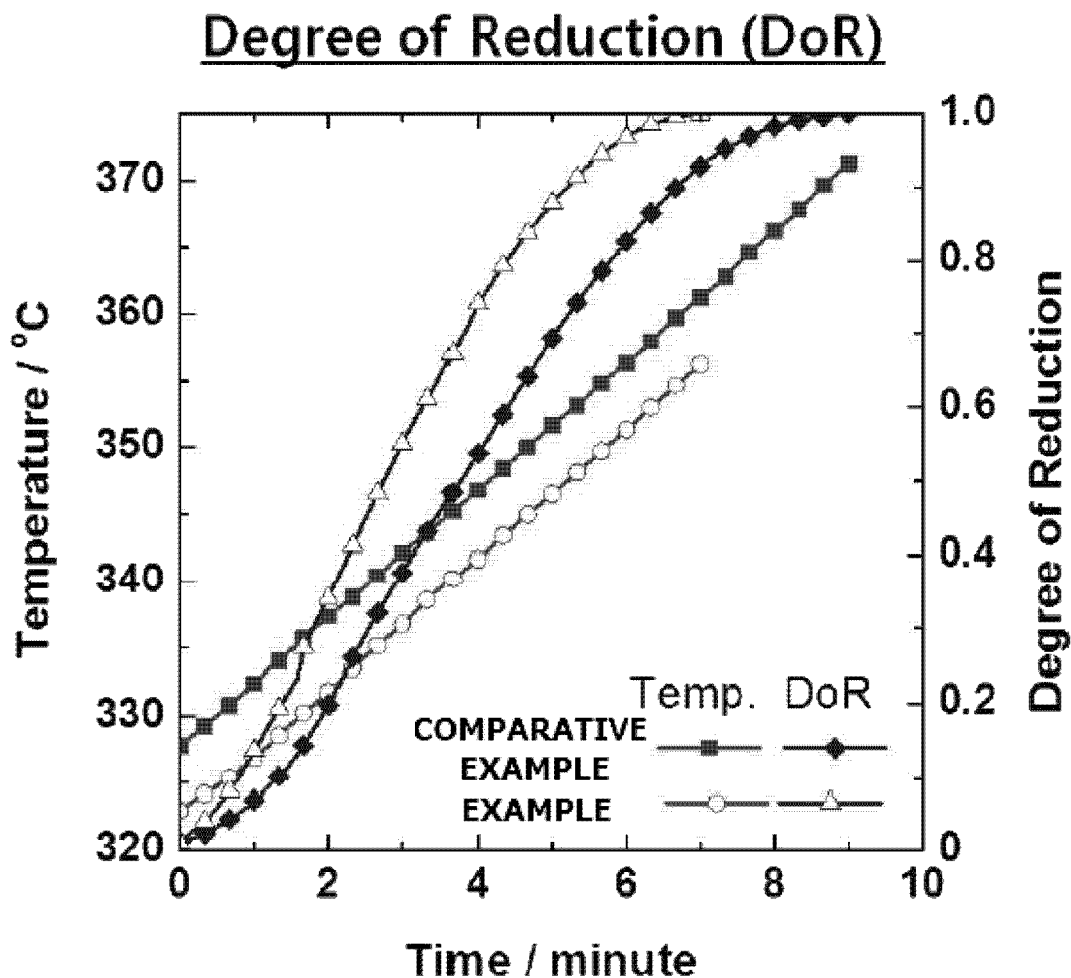

SOLID OXIDE FUEL CELL MANUFACTURING METHOD, SOLID OXIDE FUEL CELL AND CELL MODULE COMPRISING SAME

TECHNICAL FIELD

This application claims priority to and the benefits of Korean Patent Application No. 10-2015-0120160, filed with the Korean Intellectual Property Office on Aug. 26, 2015, the entire contents of which are incorporated herein by reference. The present specification relates to a method for manufacturing a solid oxide fuel cell, a solid oxide fuel cell and a cell module including the same.

BACKGROUND ART

With recent predictions about the exhaustion of existing energy resources such as petroleum and coal, interests in alternative energy capable of replacing these have been growing. As one of such alternative energy, fuel cells have received attention with advantages of being highly efficient, not emitting pollutants such as NOx and SOx, and having sufficient fuel to use.

Fuel cells are a power generating system converting chemical reaction energy of fuel and oxidizer to electric energy, and hydrogen, methanol and hydrocarbon such as butane are used as the fuel, and oxygen is typically used as the oxidizer.

Fuel cells include polymer electrolyte membrane-type fuel cells (PEMFC), direct methanol-type fuel cells (DMFC), phosphoric acid-type fuel cells (PAFC), alkaline-type fuel cells (AFC), molten carbonate-type fuel cells (MCFC), solid oxide-type fuel cells (SOFC) and the like.

FIG. 1 is a diagram schematically showing a principle of electricity generation of a solid oxide-type fuel cell, and a solid oxide-type fuel cell is formed with an electrolyte layer, and fuel electrode (anode) and an air electrode (cathode) formed on both surfaces of this electrolyte layer. When referring to FIG. 1 showing a principle of electricity generation of a solid oxide-type fuel cell, air is electrochemically reduced in an air electrode to produce oxygen ions, and the produced oxygen ions are transferred to a fuel electrode through an electrolyte layer. In the fuel electrode, fuel such as hydrogen, methanol and butane is injected, and the fuel releases electrons while bonding to the oxygen ions and electrochemically oxidized to produce water. Through such a reaction, electrons migrate to an external circuit.

DISCLOSURE

Technical Problem

The present specification is directed to providing a method for manufacturing a solid oxide fuel cell, a solid oxide fuel cell and a cell module including the same.

Technical Solution

One embodiment of the present specification provides a method for manufacturing a solid oxide fuel cell including preparing a fuel electrode green sheet using fuel electrode slurry including oxygen ion conductive inorganic particles and NiO, or preparing a pellet using a solid including oxygen ion conductive inorganic particles and NiO; bringing a diffuser plate into contact with one surface of the fuel electrode green sheet or the pellet; preparing a fuel electrode by sintering the fuel electrode green sheet or the pellet that the diffuser plate is brought into contact with; separating the diffuser plate from the sintered fuel electrode; and consecutively forming an electrolyte layer and an air electrode on the surface of the sintered fuel electrode from which the diffuser plate is separated.

Another embodiment of the present specification provides a solid oxide fuel cell consecutively provided with a fuel electrode including an oxygen ion conductive inorganic substance and NiO, an electrolyte layer and an air electrode, wherein an amount of the NiO on a surface of the fuel electrode in contact with the electrolyte layer is 70 parts by weight or less based on 100 parts by weight of an amount of the NiO on a surface opposite to the surface of the fuel electrode in contact with the electrolyte layer.

Still another embodiment of the present specification provides a cell module including the solid oxide fuel cell as a unit cell.

Advantageous Effects

A fuel electrode according to the present specification can have an increased binding property with an electrolyte layer.

A solid oxide fuel cell according to the present specification has an advantage of having low interfacial resistance between a fuel electrode and an electrolyte layer.

A solid oxide fuel cell according to the present specification has an advantage of having many reaction sites at an interface of a fuel electrode and an electrolyte layer.

DESCRIPTION OF DRAWINGS

FIG. 1 is a schematic diagram showing a principle of electricity generation of a solid oxide fuel cell (SOFC).

FIG. 2 illustrates a structure of a solid oxide fuel cell according to one embodiment of the present specification.

FIG. 3 is a SEM image of a fuel electrode surface of an example.

FIG. 4 is a SEM image of a fuel electrode surface of a comparative example.

FIG. 5 is a graph showing changes in the degree of reduction depending on a temperature in an example and a comparative example.

REFERENCE NUMERAL

100: Fuel Electrode
200: Electrolyte Layer
300: Air Electrode

[Mode for Disclosure]

Hereinafter, the present specification will be described in detail.

One embodiment of the present specification provides a method for manufacturing a solid oxide fuel cell including preparing a fuel electrode green sheet using fuel electrode slurry including oxygen ion conductive inorganic particles and NiO, or preparing a pellet using a solid including oxygen ion conductive inorganic particles and NiO; bringing a diffuser plate into contact with one surface of the fuel electrode green sheet or the pellet; preparing a fuel electrode by sintering the fuel electrode green sheet or the pellet that the diffuser plate is brought into contact with; separating the diffuser plate from the sintered fuel electrode; and consecutively forming an electrolyte layer and an air electrode on the surface of the sintered fuel electrode from which the diffuser plate is separated.

The method for manufacturing a solid oxide fuel cell includes preparing a fuel electrode green sheet using fuel electrode slurry including oxygen ion conductive inorganic particles and NiO, or preparing a pellet using a solid including oxygen ion conductive inorganic particles and NiO.

In the present specification, the green sheet means a film-type membrane in a state capable of being processed in a next step rather than a complete final product. In other words, the green sheet is coating with a coating composition including inorganic particles and a solvent, and drying to a sheet-type, and the green sheet refers to a sheet in a semi-dried state capable of maintaining a sheet form while including some solvent.

In the present specification, the pellet means a lump state prepared by placing a solid excluding a solvent in a mold and compressing the result.

The oxygen ion conductive inorganic particles are not particularly limited as long as it has oxygen ion conductivity, and the oxygen ion conductive inorganic particles may include at least one of yttria stabilized zirconia (YSZ: $(Y_2O_3)_x(ZrO_2)_{1-x}$, x=0.05 to 0.15), scandia stabilized zirconia (ScSZ: $(Sc_2O_3)_x(ZrO_2)_{1-x}$, x=0.05 to 0.15), samarium doped ceria (SDC: $(Sm_2O_3)_x(CeO_2)_{1-x}$, x=0.02 to 0.4), gadolinium doped ceria (GDC: $(Gd_2O_3)_x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM). Specifically, the oxygen ion conductive inorganic particles may be gadolinium doped ceria (GDC: $(Gd_2O_3)_x(CeO_2)_{1-x}$, x=0.02 to 0.4).

Based on the sum of the weights of the oxygen ion conductive inorganic particles and the NiO, the content of the oxygen ion conductive inorganic particles may be 29.81 wt % or more and 48.87 wt % or less. In this case, the fuel electrode has advantages of maintaining physical strength and long-term stability.

Based on the sum of the weights of the oxygen ion conductive inorganic particles and the NiO, the content of the NiO may be 51.13 wt % or more and 70.19 wt % or less. This has an advantage of maintaining battery cell efficiency due to proper electrical conductivity.

The fuel electrode slurry may further include a binder resin, a plasticizer, a dispersant and a solvent. The binder resin, the plasticizer, the dispersant and the solvent are not particularly limited, and common materials known in the art may be used.

The method for manufacturing a solid oxide fuel cell includes bringing a diffuser plate into contact with one surface of the fuel electrode green sheet or the pellet.

The diffuser plate means a plate allowing Ni distributed on the surface of the fuel electrode green sheet or the pellet brought into contact with during the sintering time of heating the fuel electrode green sheet or the pellet to selectively move to the diffuser plate.

The diffuser plate is not particularly limited as long as it is capable of selectively moving Ni distributed on the surface of the fuel electrode green sheet or the pellet to the diffuser plate, and the diffuser plate may include at least one of alumina, zirconia, ceria, and yttria stabilized zirconia.

The method for manufacturing a solid oxide fuel cell includes preparing a fuel electrode by sintering the fuel electrode green sheet or the pellet that the diffuser plate is brought into contact with.

The sintering temperature of the fuel electrode green sheet or the pellet that the diffuser plate is brought into contact with may be 1100° C. or more and 1600° C. or less. This has advantages in that reactants and products are smoothly transferred during cell driving, and required mechanical strength is maintained.

Specifically, the sintering temperature of the fuel electrode green sheet or the pellet may be 1300° C. or more and 1500° C. or less. More specifically, the sintering temperature of the fuel electrode green sheet or the pellet may be 1400° C. or more and 1500° C. or less.

The sintering time of the fuel electrode green sheet or the pellet that the diffuser plate is brought into contact with may be 1 hour or more and 5 hours or less. Specifically, the sintering time of the fuel electrode green sheet or the pellet may be 2 hours or more and 4 hours or less.

The fuel electrode green sheet or the pellet that the diffuser plate is brought into contact with may be sintered for 2 hours or more and 4 hours or less at 1400° C. or more and 1500° C. or less. Specifically, the fuel electrode green sheet or the pellet that the diffuser plate is brought into contact with may be sintered for 3 hours at 1500° C.

The sintered fuel electrode may have a thickness of 10 μm or more and 50 μm or less. Specifically, the sintered fuel electrode may have a thickness of 20 μm or more and 40 μm or less.

The sintered fuel electrode may be a fuel electrode support relatively thicker than other layers. When the sintered fuel electrode is a fuel electrode support, the sintered fuel electrode may have a thickness of or more 100 μm and 5 mm or less, and specifically, the sintered fuel electrode may have a thickness of 100 μm or more and 900 μm or less, and more specifically, the sintered fuel electrode may have a thickness of 300 μm or more and 800 μm or less.

The sintered fuel electrode may have porosity of 20% or more and 60% or more. Specifically, the sintered fuel electrode may have porosity of 30% or more and 50% or less.

The sintered fuel electrode may have a pore diameter of 0.1 μm or more and 10 μm or less. Specifically, the sintered fuel electrode may have a pore diameter of 0.5 μm or more and 5 μm or less. More specifically, the sintered fuel electrode may have a pore diameter of 0.5 μm or more and 2 μm or less.

The method for manufacturing a solid oxide fuel cell includes separating the diffuser plate from the sintered fuel electrode.

The amount of the NiO on a surface of the sintered fuel electrode from which the diffuser plate is separated may be 70 parts by weight or less when the amount of the NiO on a surface opposite to the surface of the sintered fuel electrode from which the diffuser plate is separated is 100 parts by weight. Specifically, the amount of the NiO on a surface of the sintered fuel electrode from which the diffuser plate is separated may be 5 parts by weight or more and 70 parts by weight or less when the amount of the NiO on a surface opposite to the surface of the sintered fuel electrode from which the diffuser plate is separated is 100 parts by weight.

The amount of the NiO on a surface of the sintered fuel electrode from which the diffuser plate is separated may be 50 parts by weight or less when the amount of the NiO on a surface opposite to the surface of the sintered fuel electrode from which the diffuser plate is separated is 100 parts by weight. Specifically, the amount of the NiO on a surface of the sintered fuel electrode from which the diffuser plate is separated may be 5 parts by weight or more and 50 parts by weight or less when the amount of the NiO on a surface opposite to the surface of the sintered fuel electrode from which the diffuser plate is separated is 100 parts by weight. More specifically, the amount of the NiO on a surface of the sintered fuel electrode from which the diffuser plate is separated may be 5 parts by weight or more and 30 parts by weight or or less when the amount of the NiO on a surface opposite to the surface of the sintered fuel electrode from which the diffuser plate is separated is 100 parts by weight.

The surface of the sintered fuel electrode from which the diffuser plate is separated adjoins a dense electrolyte layer even when almost no Ni is present due to the diffusion of Ni with the diffuser plate, and therefore, the surface from which the diffuser plate is separated with almost no Ni does not affect electrical conduction between the fuel electrode and the electrolyte layer. Rather, the surface of the sintered fuel electrode from which the diffuser plate is separated produces unevenness made while Ni diffuses by the diffuser plate, and fuel cell performance becomes favorable due to an increase in the area adjoining a dense electrolyte layer.

The method for manufacturing a solid oxide fuel cell includes consecutively forming an electrolyte layer and an air electrode on the surface of the sintered fuel electrode from which the diffuser plate is separated.

The method of forming an electrolyte layer and an air electrode on the surface of the sintered fuel electrode from which the diffuser plate is separated is not particularly limited. For example, an electrolyte layer may be formed by laminating a green sheet prepared with electrolyte layer slurry on the surface of the sintered fuel electrode from which the diffuser plate is separated and sintering the result, and an air electrode may be formed by laminating a green sheet prepared with air electrode slurry on the sintered electrolyte layer and sintering the result.

Materials of the electrolyte layer and the air electrode are not particularly limited, and materials generally used in the art may be employed.

Another embodiment of the present specification provides a solid oxide fuel cell consecutively provided with a fuel electrode including an oxygen ion conductive inorganic substance and NiO, an electrolyte layer and an air electrode.

The amount of the NiO on a surface of the fuel electrode in contact with the electrolyte layer may be 70 parts by weight or less when the amount of the NiO on a surface opposite to the surface of the fuel electrode in contact with the electrolyte layer is 100 parts by weight. Specifically, the amount of the NiO on a surface of the fuel electrode in contact with the electrolyte layer may be 5 parts by weight or more and 70 parts by weight or less when the amount of the NiO on a surface opposite to the surface of the fuel electrode in contact with the electrolyte layer is 100 parts by weight.

The amount of the NiO on a surface of the fuel electrode in contact with the electrolyte layer may be 70 parts by weight or less when the amount of the NiO on a surface opposite to the surface of the fuel electrode in contact with the electrolyte layer is 100 parts by weight. Specifically, the amount of the NiO on a surface of the fuel electrode in contact with the electrolyte layer may be 5 parts by weight or more and 50 parts by weight or less when the amount of the NiO on a surface opposite to the surface of the fuel electrode in contact with the electrolyte layer is 100 parts by weight. The amount of the NiO on a surface of the fuel electrode in contact with the electrolyte layer may be 5 parts by weight or more and 30 parts by weight or less when the amount of the NiO on a surface opposite to the surface of the fuel electrode in contact with the electrolyte layer is 100 parts by weight.

A mean deviation of the profile (Ra) of the surface of the fuel electrode in contact with the electrolyte layer may be 2.2 μm or greater. The higher the mean deviation of the profile of the surface of the fuel electrode in contact with the electrolyte layer, the more favorable, and the upper limit is not particularly limited. In this case, there are advantages in that interfacial resistance decreases due to an increase in the surface area of the fuel electrode in contact with the electrolyte layer, and reactions sites increase.

In the present specification, Ra represents an arithmetic mean deviation of the profile, and statistically, an arithmetic mean of deviation of a surface roughness curve with respect to a mean line.

In the present specification, Ra is prepared based on the values measured using an optical profiler of NanoMap.

A difference in the arithmetic mean deviation of the profile between a surface of the fuel electrode in contact with the electrolyte layer and a surface opposite to the surface of the fuel electrode in contact with the electrolyte layer may be 0.1 μm or more and 1.6 μm or less.

Still another embodiment of the present specification provides a cell module including the solid oxide fuel cell as a unit cell.

The cell module may include a stack including unit cells including the solid oxide fuel cells, and a separator provided between the unit cells; a fuel supply unit supplying fuel to the stack; and an oxidizer supply unit supplying an oxidizer to the stack.

The cell module may specifically be used as a power supply of electric vehicles, hybrid electric vehicles, plug-in hybrid electric vehicles or power storage devices.

Hereinafter, the present specification will be described in more detail with reference to examples. However, the following examples are for illustrative purposes only, and the scope of the present specification is not limited thereto.

EXAMPLE

A fuel electrode (10 wt % carbon black based on the total solid weight) green sheet mixing Ni and GDC in a volume ratio of 5:5 (weight ratio of NiO:GDC=61:39) was pre-sintered for 3 hours at 1400° C., and after bringing an alumina plate into contact with both surfaces of the fuel electrode support, the result was full-sintered for 3 hours at 1500° C.

COMPARATIVE EXAMPLE

A fuel electrode was prepared in the same manner as in the example, except that the diffuser plate was not brought into contact with the fuel electrode green sheet, and only the fuel electrode green sheet was pre-sintered for 3 hours at 1400° C. and then full-sintered for 3 hours at 1500° C.

TEST EXAMPLE 1

Surfaces of the fuel electrodes of the example and the comparative example were observed using a scanning electron microscope (SEM), and the results are shown in FIG. 3 and FIG. 4, respectively.

As a result, it was seen that the surface of the fuel electrode of the example shown in FIG. 3 had more pores and was rough compared to the surface of the fuel electrode of the comparative example shown in FIG. 4.

TEST EXAMPLE 2

As a result of an elemental analysis made through energy dispersive X-ray (EDX) on the surfaces of the fuel electrodes of the example and the comparative example, it was seen that the Ni content of the example was less than the Ni content of the comparative example as in the following Table 1.

TABLE 1

| Component | Example Content (% by Weight) | Atomic % | Comparative Example Content (% by Weight) | Atomic % |
|---|---|---|---|---|
| O K | 18.86 | 66.02 | 19.05 | 54.85 |
| Ni K | 3.45 | 3.29 | 40.97 | 32.16 |
| Ce L | 69.31 | 27.70 | 35.55 | 11.69 |
| Gd L | 8.39 | 2.99 | 4.43 | 1.30 |

In Table 1, K and L mean detecting electrons coming from K shell or L shell, respectively, among electron shells.

TEST EXAMPLE 3

Results of measuring a degree of reduction depending on the temperature of each of the fuel electrodes of the example and the comparative example using a 4-point probe method are shown in FIG. 5.

As shown in FIG. 5, it was seen that the example contained less nickel, a target material of reduction, identified through a shorter reducing time in the example compared to the comparative example.

TEST EXAMPLE 4

For the fuel electrodes of the example and the comparative example prepared in a volume of 10 mm×25 mm×0.8 mm, any spot was selected on each surface, and surface roughness for the area of 1 mm×1.2 mm was measured using an optical profiler of NanoMap.

When measuring a mean deviation of the profile for the surface of the fuel electrode in contact with the diffuser plate of the example and a mean deviation of the profile for the surface of the comparative example, a mean deviation of the profile for the surface of the fuel electrode in contact with the diffuser plate of the example and a mean deviation of the profile for the surface of the comparative example were 2.6 μm and 1.8 μm, respectively.

The invention claimed is:

1. A method for manufacturing a solid oxide fuel cell comprising:
    preparing a fuel electrode green sheet using fuel electrode slurry including oxygen ion conductive inorganic particles and NiO, or preparing a pellet using a solid including oxygen ion conductive inorganic particles and NiO;
    bringing a diffuser plate into contact with one surface of the fuel electrode green sheet or the pellet;
    preparing a fuel electrode by sintering the fuel electrode green sheet or the pellet that the diffuser plate is brought into contact with;
    separating the diffuser plate from the sintered fuel electrode; and
    consecutively forming an electrolyte layer and an air electrode on the surface of the sintered fuel electrode from which the diffuser plate is separated.

2. The method for manufacturing a solid oxide fuel cell of claim 1, wherein the diffuser plate includes at least one of alumina, zirconia, ceria, and yttria stabilized zirconia.

3. The method for manufacturing a solid oxide fuel cell of claim 1, wherein the sintered fuel electrode is a fuel electrode support.

4. The method for manufacturing a solid oxide fuel cell of claim 3, wherein the sintered fuel electrode support has a thickness of 100 μm or more and 5 mm or less.

5. The method for manufacturing a solid oxide fuel cell of claim 1, wherein an amount of the NiO on a surface of the sintered fuel electrode from which the diffuser plate is separated is 70 parts by weight or less based on 100 parts by weight of an amount of the NiO on a surface opposite to the surface of the sintered fuel electrode from which the diffuser plate is separated.

6. The method for manufacturing a solid oxide fuel cell of claim 1, wherein a sintering temperature of the fuel electrode green sheet or the pellet that the diffuser plate is brought into contact with is 1100° C. or more and 1600° C. or less.

7. The method for manufacturing a solid oxide fuel cell of claim 1, wherein a sintering time of the fuel electrode green sheet or the pellet that the diffuser plate is brought into contact with is 1 hour or more and 5 hours or less.

8. The method for manufacturing a solid oxide fuel cell of claim 1, wherein the oxygen ion conductive inorganic particles include at least one of yttria stabilized zirconia (YSZ: $(Y_2O_3)_x(ZrO_2)_{1-x}$, x=0.05 to 0.15), scandia stabilized zirconia (ScSZ: $(Sc_2O_3)_x(ZrO_2)_{1-x}$, x=0.05 to 0.15), samarium doped ceria (SDC: $(Sm_2O_3)_x(CeO_2)_{1-x}$, x=0.02 to 0.4), gadolinium doped ceria (GDC: $(Gd_2O_3)_x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

* * * * *